(12) United States Patent
Zhou et al.

(10) Patent No.: US 8,662,173 B2
(45) Date of Patent: Mar. 4, 2014

(54) PLUGGING THIEF ZONES AND FRACTURES BY IN-SITU AND IN-DEPTH CRYSTALLIZATION FOR IMPROVING WATER SWEEP EFFICIENCY OF SANDSTONE AND CARBONATE RESERVOIRS

(75) Inventors: Xianmin Joe Zhou, Dhahran (SA); Yun Chang, Saudi Aramco (SA)

(73) Assignee: Saudi Arabian Oil Company, Dhahran (SA)

( * ) Notice: Subject to any disclaimer, the term of this patent is extended or adjusted under 35 U.S.C. 154(b) by 437 days.

(21) Appl. No.: 13/083,750

(22) Filed: Apr. 11, 2011

(65) Prior Publication Data

US 2012/0255728 A1    Oct. 11, 2012

(51) Int. Cl.
 *E21B 33/138* (2006.01)
 *E21B 43/22* (2006.01)
 *C09K 8/46* (2006.01)

(52) U.S. Cl.
 USPC ........ 166/292; 166/270; 166/272.6; 166/300; 166/303; 423/629; 507/266; 507/269; 507/277

(58) Field of Classification Search
 None
 See application file for complete search history.

(56) References Cited

U.S. PATENT DOCUMENTS

| | | | |
|---|---|---|---|
| 3,687,200 A * | 8/1972 | Routson | 166/275 |
| 3,730,272 A | 5/1973 | Richardson et al. | |
| 3,741,307 A | 6/1973 | Sandiford et al. | |
| 3,756,315 A * | 9/1973 | Suman et al. | 166/276 |
| 3,847,638 A * | 11/1974 | Suman et al. | 106/287.17 |
| 3,997,452 A * | 12/1976 | Richardson et al. | 507/206 |
| 4,009,755 A | 3/1977 | Sandiford | |
| 4,031,958 A | 6/1977 | Sandiford et al. | |
| 4,069,869 A | 1/1978 | Sandiford | |
| 4,348,296 A | 9/1982 | Bauman et al. | |
| 4,413,680 A | 11/1983 | Sandiford et al. | |
| 4,534,412 A | 8/1985 | Dovan et al. | |
| 4,569,393 A | 2/1986 | Bruning et al. | |
| 4,889,563 A | 12/1989 | Parker et al. | |
| 4,940,091 A | 7/1990 | Shu et al. | |
| 5,653,947 A | 8/1997 | Lamerant | |
| 7,488,705 B2 | 2/2009 | Reddy et al. | |
| 2007/0284102 A1 * | 12/2007 | Davies et al. | 166/292 |
| 2010/0051275 A1 | 3/2010 | Lewis et al. | |

OTHER PUBLICATIONS

Pritchett et al., "Field Application of a New In-Depth Waterflood Conformance Improvement Tool", SPE International, Society of Petroleum Engineers Inc., 2003, SPE 84897.

Frampton et al., "Development of a novel waterflood conformance control system", SPE International, Society of Petroleum Engineers Inc., 2004, SPE 89391.

(Continued)

*Primary Examiner* — George Suchfield
(74) *Attorney, Agent, or Firm* — Bracewell & Giuliani LLP

(57) ABSTRACT

The present invention relates to methods and compositions that can be used to delay crystallization of a treatment solution so that thief zones or fractures are plugged in subterranean formations at a substantial distance from a wellbore. A supersaturated sodium aluminate solution, or other solutions, are introduced into the reservoir. The solution is relatively stable in the supersaturated state. Crystallization, or de-stabilizing the solution, can be controlled, which in turn plugs the thief zone or fracture at a designed point of time. By controlling the time that crystallization starts, i.e., the induction period, thief zones that are located at a substantial distant from the wellbore can be plugged.

23 Claims, 1 Drawing Sheet

(56) References Cited

OTHER PUBLICATIONS

Yanez et al., "New Attempt in Improving Sweep Efficiency at the Mature Koluel Kaike and Piedra Clavada Waterflooding Projects of the S. Jorge Basin in Argentina", SPE International, Society of Petroleum Engineers Inc., 2007, SPE 107923.

Sierra et al, "New Completion Methodology to Improve Oil Recovery and Minimize Water Intrusion in Reservoirs Subject to Water Injection", SPE International, Society of Petroleum Engineers Inc., 2010, SPE 127221.

PCT International Search Report dated Jul. 16, 2012; International Application No. PCT/US2012/032889; International Filing Date: Apr. 10, 2012.

* cited by examiner

PLUGGING THIEF ZONES AND FRACTURES BY IN-SITU AND IN-DEPTH CRYSTALLIZATION FOR IMPROVING WATER SWEEP EFFICIENCY OF SANDSTONE AND CARBONATE RESERVOIRS

BACKGROUND OF THE INVENTION

1. Field of the Invention

This invention relates to compositions and methods for treating subterranean formations. More specifically, the present invention relates to compositions and methods for plugging thief zones and fractures in subterranean formations.

2. Description of the Related Art

Water flooding is an important method that can be used to recover oil from both sandstone and carbonate reservoirs. Only approximately one third of the original oil in place (OOIP) is recovered by primary and secondary recovery processes, typically leaving two-thirds of the OOIP trapped in reservoirs as residual oil after water flooding. Approximately 50% of discovered oil in the world is in carbonate reservoirs with most of these reservoirs having natural fractures.

Most of carbonated reservoirs in areas of the world, such as Saudi Arabia, are completely underlain by water with a large oil column and the gas cap. The gas cap plays a major role in production of oil fields. To effectively develop carbonated reservoirs having a large gas cap, early gas breakthrough and gas slippage need to be prevented.

A completion methodology referred to as water flooding has been used to improve oil recovery and minimize water intrusion in the formation. Water flooding takes into consideration the placement of a fracture barrier at the toe of the producing well to delay water intrusion and improve oil recovery efficiency. Others have developed in-depth water flood conformance improvement tools that use time-delayed, highly expandable particulate material (e.g., Kernel particles/ Bright water) that can improve the sweep efficiency of a water flood. The expanded Kernel particles can provide resistance to fluid flow in the formation. The material appears to plug pores at up to about 125 feet from the injector, which generally can result in a reduction of water cut by more than 60%. The Kernel particles treatment, however, was intended for diverting water in the matrix, not the fractures.

High residual oil saturation is in part cause by poor sweep in fractured reservoirs. Conventional water flooding is used to displace oil from the permeable zones or fractures, bypassing substantial amounts of trapped oil in the lower permeability zones. If the carbonate reservoir is preferentially oil-wet, the matrix will retain oil and high residual oil saturation in the matrix when injected water breakthroughs from fractures and/or high permeability zones ("thief zones").

The thief zones or fractures are often a rather long distant away from the wellbore. It is preferable to leave the vicinity of the wellbore open and permeable and to plug only the area considered to be the thief zones. Therefore, plugging the right location is a delicate undertaking that requires precise distance, timing and solution properties.

A need exists for compositions and methods that can be used to plug pores/fractures in the thief zone. There is also a need to plug thief zones or fractures in the formations that are farther away (e.g., greater than 125 feet) from the injector or wellbore than other prior methods have been able to achieve. It would be advantageous of such compositions and methods could be used to control the locations that are to be plugged.

SUMMARY OF THE INVENTION

In view of the foregoing, the present invention relates to methods and compositions for use to delay crystallization of a treatment solution so that thief zones or fractures are plugged in subterranean formations at a substantial distance from a wellbore. In embodiments of the present invention, a supersaturated sodium aluminate solution, or other solutions, are introduced into the reservoir. The solution is relatively stable in the supersaturated state. Crystallization, or de-stabilizing the solution, is controlled, which in turn plugs the thief zone or fracture at a designed point of time. By controlling the time that crystallization starts, i.e., the induction period, thief zones that are located at a substantial distant from the wellbore can be plugged.

As an embodiment of the present invention, a treatment fluid for treating a subterranean formation so that thief zones or fractures in the subterranean formation are plugged at a substantial distance from a wellbore is provided. In this embodiment, the treatment fluid includes a sodium aluminate solution and a delayed crystallization additive. The sodium aluminate solution includes $NaAl(OH)_4$. The sodium aluminate solution forms gibbsite ($Al(OH)_{3\,s}$) within the subterranean formation. The delayed crystallization additive within the treatment fluid delays crystallization and formation of the gibbsite in the subterranean formation so that the thief zones or fractures can be plugged with the precipitated gibbsite at a substantial distance from the wellbore.

Another treatment fluid for treating a subterranean formation so that thief zones or fractures in the subterranean formation are plugged at a substantial distance from a wellbore is provided as an embodiment of the present invention. In this embodiment, the treatment fluid includes a supersaturated sodium aluminate solution comprising $NaAl(OH)_4$ prepared using a molar ratio of $Na_2O:Al_2O_3$ of about 0.5 to about 4.0 and a delayed crystallization additive. The supersaturated sodium aluminate solution forms gibbsite ($Al(OH)_{3\,s}$) within the subterranean formation. The supersaturated sodium aluminate solution has a supersaturation ratio ranging from about 100% to about 300% at a temperature ranging from about 70° C. to about 200° C. The delayed crystallization additive within the treatment fluid delays crystallization and formation of the gibbsite in the subterranean formation so that the thief zones or fractures can be plugged with the precipitated gibbsite at a substantial distance from the wellbore.

As another embodiment of the present invention, a process of treating a subterranean formation so that thief zones or fractures are plugged in the subterranean formation at a substantial distance from a wellbore is provided. In this embodiment, the process includes contacting the subterranean formation with a sodium aluminate solution comprising $NaAl(OH)_4$ and a delayed crystallization additive. The sodium aluminate solution forms gibbsite ($Al(OH)_{3\,s}$) within the subterranean formation. Crystallization of the gibbsite in the subterranean formation is delayed in this process using the delayed crystallization additive so that the thief zones or fractures are plugged with the precipitated gibbsite at a substantial distance from the wellbore.

Embodiments of the present invention are used to plug the thief zone and fractures by controlling the induction period of the crystallization process. The crystals formed using the methods and compositions of the present invention can plug fractures as well as the pores in the matrix at a substantial distance from the wellbore.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE DISCLOSURE

Figure 1:
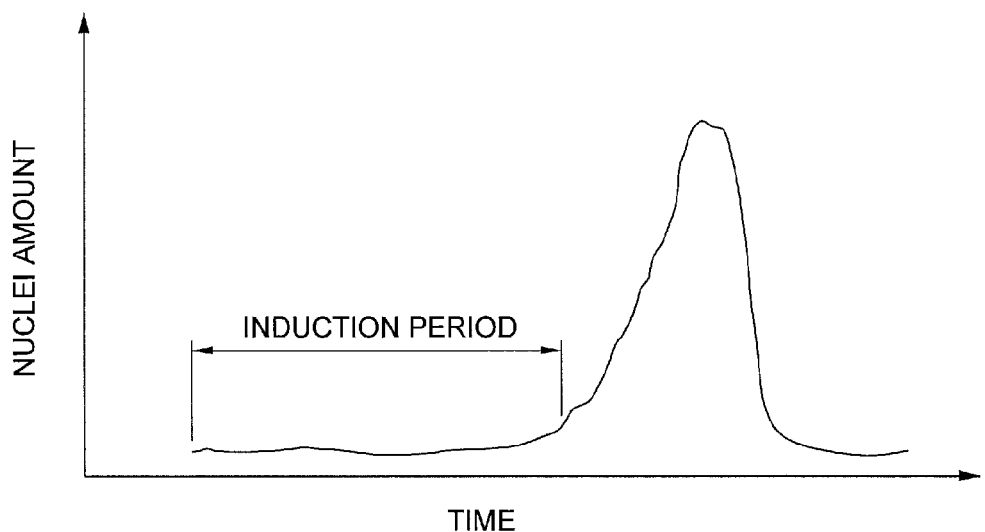
FIG. 1 is a chart of the nuclei amount versus time for the formation of gibbsite illustrating how the induction period can vary made in accordance with embodiments of the present invention.

Embodiments of the present invention provide in-situ, in-depth crystallization in the thief zone or fractures in sandstone or carbonate reservoirs. Furthermore, embodiments of the present invention relate to methods and compositions that can be used to delay crystallization of a treatment solution so that thief zones or fractures are plugged in subterranean formations at a substantial distance from a wellbore.

In embodiments of the present invention, a supersaturated sodium aluminate solution, or other solutions, are introduced into the reservoir. The solution is relatively stable in the supersaturated state. Crystallization, or de-stabilizing the solution, can be controlled, which in turn plugs the thief zone or fracture at a designed point of time. By controlling the time that crystallization starts, i.e., the induction period, thief zones that can be located at a substantial distant from the wellbore can be plugged.

More specifically, as an embodiment of the present invention, a treatment fluid for treating a subterranean formation so that thief zones or fractures in the subterranean formation are plugged at a substantial distance from a wellbore is provided. In this embodiment, the treatment fluid includes a sodium aluminate solution and a delayed crystallization additive. The sodium aluminate solution includes $NaAl(OH)_4$. The sodium aluminate solution forms solid gibbsite (referred to as $Al(OH)_3$ or $Al(OH)_{3\ s}$) within the subterranean formation. The delayed crystallization additive within the treatment fluid delays crystallization and formation of the gibbsite in the subterranean formation so that the thief zones or fractures can be plugged with the precipitated gibbsite at a substantial distance from the wellbore.

Various types of compounds can be used to delay the crystallization of gibbsite in the treatment fluid. For example, the delayed crystallization additive can include methanol, a surfactant, gibbsite seeds, sodium bicarbonate, carbon dioxide, or combinations thereof. Other suitable types of compounds that can be used to delay crystallization and formation of gibbsite in the treatment fluid will be apparent to those of skill in the art and are to be considered within the scope of the present invention.

The amount of the delayed crystallization in the treatment fluid can vary, depending upon the needed delay time for the specific subterranean formation. Generally, the longer the needed delay time, the higher the amount of delayed crystallization additive in the treatment fluid. For example, the delayed crystallization additive can be present in a range of about 0 wt. % to about 40 wt. % of the treatment fluid. Other suitable amounts of delayed crystallization additive will be apparent to those of skill in the art and are to be considered within the scope of the present invention.

It is possible for the treatment fluid to be sent to areas that do not necessarily need to be plugged. If this occurs, the formed crystallized gibbsite can be dissolved using sodium hydroxide. For this reason, in an aspect, the treatment fluid can also include sodium hydroxide to dissolve the gibbsite and reform the sodium aluminate solution if the gibbsite needs to be removed from the subterranean formation.

In an aspect, the treatment fluid of embodiments of the present invention is supersaturated. In another aspect, the sodium aluminate solution is supersaturated. The amount of supersaturation varies depending upon the needed delay time for the subterranean formation. For example, the sodium aluminate solution can have a supersaturation ratio ranging from about 100% to about 300% at a temperature ranging from about 70° C. to about 200° C. Other suitable supersaturation ratios will be apparent to those of skill in the art and are to be considered within the scope of the present invention.

The physical properties of the treatment fluid of the present invention can vary. For example, the pH can range from about 8 to about 14. Other physical properties and ranges for the physical properties that can be used in embodiments of the present invention will be apparent to those of skill in the art and are to be considered within the scope of the present invention.

The sodium aluminate solution can be prepared by (1) reacting $Na_2O$ with $Al_2O_3$, (2) dissolving aluminum oxide in sodium hydroxide, or (3) dissolving aluminum hydroxide in sodium hydroxide. In one aspect, the sodium aluminate solution is prepared using a molar ratio of $Na_2O:Al_2O_3$ of about 0.5 to about 4.0. Other suitable molar ratios of $Na_2O:Al_2O_3$ that can be used in embodiments of the present invention will be apparent to those of skill in the art and are to be considered within the scope of the present invention.

Another treatment fluid for treating a subterranean formation so that thief zones or fractures in the subterranean formation are plugged at a substantial distance from a wellbore is provided as an embodiment of the present invention. In this embodiment, the treatment fluid includes a supersaturated sodium aluminate solution comprising $NaAl(OH)_4$ prepared using a molar ratio of $Na_2O:Al_2O_3$ of about 0.5 to about 4.0 and a delayed crystallization additive. The supersaturated sodium aluminate solution forms gibbsite ($Al(OH)_3$) within the subterranean formation. The supersaturated sodium aluminate solution has a supersaturation ratio ranging from about 100% to about 300% at a temperature ranging from about 70° C. to about 200° C. The delayed crystallization additive within the treatment fluid delays crystallization and formation of the gibbsite in the subterranean formation so that the thief zones or fractures can be plugged with the precipitated gibbsite at a substantial distance from the wellbore.

As another embodiment of the present invention, a process of treating a subterranean formation so that thief zones or fractures are plugged in the subterranean formation at a substantial distance from a wellbore is provided. In this embodiment, the process includes contacting the subterranean formation with a sodium aluminate solution comprising NaAl(OH)$_4$ and a delayed crystallization additive. The sodium aluminate solution forms gibbsite (Al(OH)$_3$) within the subterranean formation. Crystallization of the gibbsite in the subterranean formation is delayed in this process using the delayed crystallization additive so that the thief zones or fractures can be plugged with the precipitated gibbsite at a substantial distance from the wellbore.

The sodium aluminate solution is generally prepared prior to sending the sodium aluminate solution into the subterranean formation. In an aspect, the sodium aluminate solution is maintained at a temperature ranging from about 70° C. to about 200° C. prior to being contacted with the subterranean formation.

Once the sodium aluminate solution is contacted with the subterranean formation, the process conditions are can be substantially different from above ground conditions. For examples, the subterranean formation can have an operating temperature ranging from about 70° C. to about 200° C. The compositions and methods of the present invention can be used in other temperature ranges that will be apparent to those of skill in the art and are to be considered within the scope of the present invention.

In embodiments of the present invention, nucleation occurs after a certain period of time (i.e., the induction period) has elapsed in a supersaturated solution. The induction period can be as short as micro-seconds or as long as several days, as generally shown in FIG. 1. Induction period can be manipulated by agitation, sonication, temperature, seeding, anti-solvents, and other additives. For example, super-saturated sodium aluminate solution can remain in supersaturated state for a number of days (6) before it precipitates and forms gibbsite (one of several polymorphs of Al(OH)$_3$). The induction period can be changed by temperature, anti-solvents, seeding, additives, and the like. The reaction mechanism for formation of gibbsite is as follows:

NaAl(OH)$_4$→Al(OH)$_3$+NaOH

The long induction period is generally undesirable and is considered a nuisance in industrial gibbsite production. The long induction period, coupled with additives, however, can be a useful tool for plugging thief zones/fractures in sandstone and carbonate reservoirs. The addition of anti-solvents, seeds, additives, and the like to the sodium aluminate solution allows the induction period to be manipulated. Some suitable additives that can be used to control the crystallization rate can include methanol; sodium bicarbonate, CO$_2$, and the like.

Not all additives affect the crystallization rate by the same mechanism. For example, CO$_2$ and sodium bicarbonate change the crystallization rate by neutralizing NaOH and force the above reaction to shift to the right hand side, i.e. precipitating out gibbsite. In either mechanism, gibbsite solid can be formed at a designed point of time after the supersaturated solution is injected. As a result, pores/fractures in the thief zone are plugged.

As indicated previously, the process can be reversed if necessary, because aluminum tri-hydrate is soluble in strong base. The reverse reaction mechanism is as follows:

Al(OH)$_3$+NaOH→NaAl(OH)$_4$

This reversible reaction is advantageous in real oil field applications. Sometimes, the reservoir formation is damaged by foreign materials and thus the flow of oil is impeded. The formation of gibbsite in the formation can inadvertently plug zones other than the thief zones. By introducing sodium hydroxide onto the solidified gibbsite, liquid sodium aluminate solution can be regenerated (i.e., the reaction can be reversed) to remove the plug.

As an advantage of the present invention, both pores and fractures can be plugged at different and longer distances from the wellbore using the delayed crystallization methods and compositions in accordance with embodiments of the present invention. The pores and fractures can be plugged whether they are close or far away from the injector and the producer. Additional advantages include that the process is reversible, the chemicals used in embodiments of the present invention are safe for the formation and also the environment, and the hydroxide ion formed after crystallization can be used as an oil displacing agent. Sweep efficiency by water flooding can be improved as a result of using embodiments of the present invention.

EXAMPLES

Figure 2:
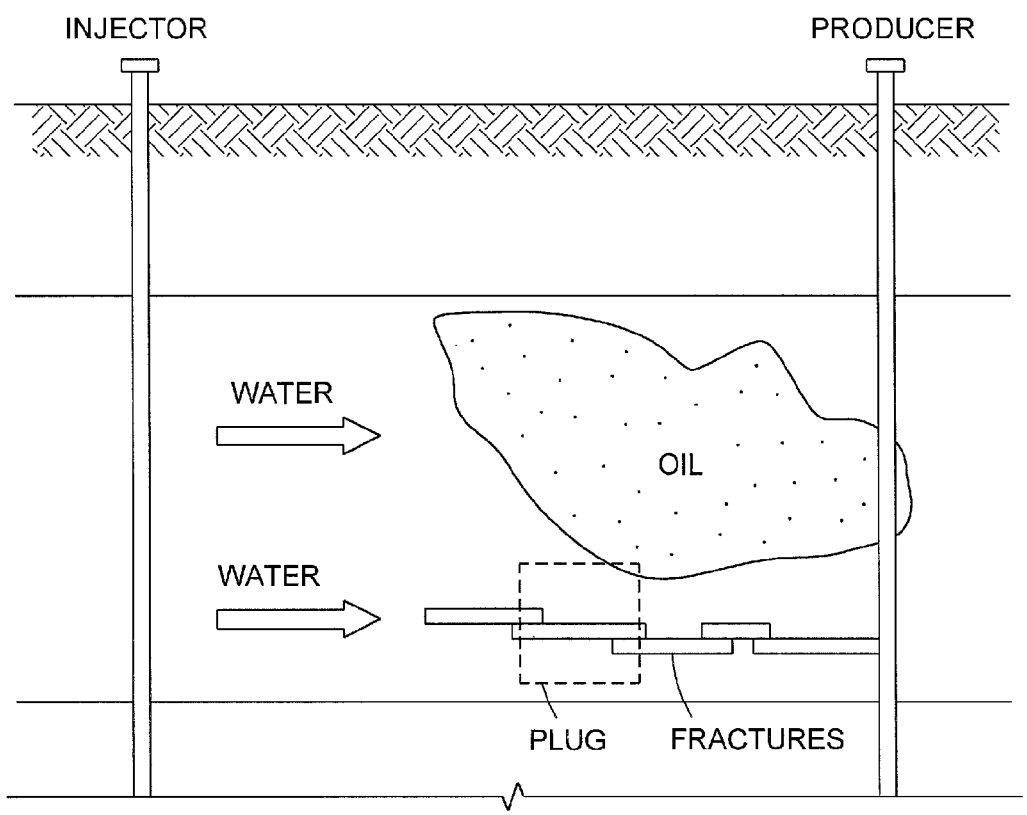
FIG. 2 illustrates where the thief zones or fractures can be plugged in the formation between the injector and the producer in accordance with embodiments of the present invention.

Thief zones or fractures can be near the injector, near the producer, or anywhere in between. Once the location of thief zones or fractures has been identified, they can be plugged using embodiments of the present invention. Referring now to FIG. 2, a thief zone/fracture can be identified first. For example, at the water injection rate, V, the zone is 20 hours (t1) away from the injector. The pore or fracture volume can be estimated to be F. For example, a slug with a cross section of 10 meter square and a depth of 1 m can be used, the required amount of sodium aluminate can then be Calculated using the pore/fracture volume estimation.

Given the above information, a supersaturated sodium aluminate solution at a particular condition such as supersaturation, temperature, Na$_2$O/Al$_2$O$_3$ ratio, NaOH amount, etc. can then be prepared. Based on the laboratory data, it is estimated that the solution will start crystallizing in about 20 hours and it will take about 2 hours to complete crystallization.

The aluminate solution can then be pumped into the injector and the solution can be over-flushed with hot water, which sends the aluminate solution to the desired depth. The injector is then shut-in for two hours to allow crystallization to complete. The plugging operation ends at time (t1+t2).

Example A

Control

This Control Example demonstrates that the pressure drop through a core is low and the permeability through the core is high when the core is not plugged. In this Example, a core was flooded with water and the pressure drop through the core was recorded to be P1. Permeability is determined to be X1.

Example B

Example B demonstrates that the pressure drop through the core is higher and the permeability through the core is lower when the core is plugged by the sodium aluminate process. A certain amount, V1, of super-saturated Sodium aluminate solution was prepared at temperature from 150° C. in a mixing vessel. The solution contained W1 grams of Na$_2$O, W2 g of Al$_2$O$_3$ and W3 g of NaOH. The supersaturated solution was then pumped into the injector. After the completion of adding supersaturated sodium aluminate solution, another amount, V2, of hot water was pumped into the injector, followed by another amount of water, V3. The injection was then stopped for a certain period of time, t1, which allowed the complete crystallization of gibbsite.

The plugging operation was completed after time t1 has elapsed. Core flood pressure drop, P2, was recorded. P2 was greater than P1, indicating formation of plugs. Permeability is measured to be X2 Darcy. X2 was less than X1, suggesting permeability was impeded by the formation of the plugs. The core was cross sectioned and analyzed for gibbsite location. It was found that most gibbsite deposited in the middle section of the core.

Example C

This example demonstrated that the location of the plug was designed by changing the induction period of the supersaturated solution. Example C was similar to Example B with the exception that the supersaturated solution contains W1 g of $Na_2O$, W4 g of $Al_2O_3$, and W3 g of NaOH. The core was cross sectioned and analyzed. It was found that most gibbsite deposited near the end of the core.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A treatment fluid for treating a subterranean formation so that thief zones or fractures in the subterranean formation are plugged at a substantial distance from a wellbore, the treatment fluid comprising:
   a. a sodium aluminate solution comprising $NaAl(OH)_4$, the sodium aluminate solution forming gibbsite $(Al(OH)_3$ s) within the subterranean formation, where the sodium aluminate solution is supersaturated; and
   b. a delayed crystallization additive to delay crystallization and formation of the gibbsite within the treatment fluid so that the thief zones or fractures can be plugged with the precipitated gibbsite at a substantial distance from the wellbore.

2. The treatment fluid of claim 1 where the delayed crystallization additive is selected from the group consisting of methanol, a surfactant, gibbsite seeds, sodium bicarbonate, carbon dioxide, and combinations thereof.

3. The treatment fluid of claim 1, wherein the delayed crystallization additive is present in a range of greater than about 0 wt. % to about 40 wt. % of the treatment fluid.

4. The treatment fluid of claim 1, further comprising sodium hydroxide to dissolve the gibbsite and reform the sodium aluminate solution if the gibbsite needs to be removed from the subterranean formation.

5. The treatment fluid of claim 1, wherein the sodium aluminate solution has a supersaturation ratio ranging from about 100% to about 300% at a temperature ranging from about 70° C. to about 200° C.

6. The treatment fluid of claim 1 having a pH ranging from about 8 to about 14.

7. The treatment fluid of claim 1, wherein the sodium aluminate solution is prepared using a molar ratio of $Na_2O$:$Al_2O_3$ of about 0.5 to about 4.0.

8. A treatment fluid for treating a subterranean formation so that thief zones or fractures in the subterranean formation are plugged at a substantial distance from a wellbore, the treatment fluid comprising:
   a. a supersaturated sodium aluminate solution comprising $NaAl(OH)_4$ prepared using a molar ratio of $Na_2O$:$Al_2O_3$ of about 0.5 to about 4.0, the supersaturated sodium aluminate solution forming gibbsite $(Al(OH)_3$ s) within the subterranean formation, the supersaturated sodium aluminate solution having a supersaturation ratio ranging from about 100% to about 300% at a temperature ranging from about 70° C. to about 200° C.; and
   b. a delayed crystallization additive to delay crystallization and formation of the gibbsite within the treatment fluid so that the thief zones or fractures can be plugged with the precipitated gibbsite at a substantial distance from the wellbore.

9. The treatment fluid of claim 8 where the delayed crystallization additive is selected from the group consisting of methanol, a surfactant, gibbsite seeds, sodium bicarbonate, carbon dioxide, and combinations thereof.

10. The treatment fluid of claim 8, wherein the delayed crystallization additive is present in a range of greater than about 0 wt. % to about 40 wt. % of the treatment fluid.

11. The treatment fluid of claim 8, further comprising sodium hydroxide to dissolve the gibbsite and reform the sodium aluminate solution if the gibbsite needs to be removed from the subterranean formation.

12. The treatment fluid of claim 8 having a pH ranging from about 8 to about 14.

13. A process of treating a subterranean formation so that thief zones or fractures are plugged in the subterranean formation at a substantial distance from a wellbore, the process comprising the steps of:
   a. contacting the subterranean formation with a sodium aluminate solution comprising $NaAl(OH)_4$ and a delayed crystallization additive, the sodium aluminate solution forming gibbsite $(Al(OH)_3$ s) within the subterranean formation, where the sodium aluminate solution is supersaturated; and
   b. delaying crystallization of the gibbsite using the delayed crystallization additive so that the thief zones or fractures can be plugged with the precipitated gibbsite at a substantial distance from the wellbore.

14. The process of claim 13 where the delayed crystallization additive is selected from the group consisting of methanol, a surfactant, gibbsite seeds, sodium bicarbonate, carbon dioxide, and combinations thereof.

15. The process of claim 13, wherein the delayed crystallization additive is present in a range of greater than about 0.0 wt. % to about 40 wt. % of the treatment fluid.

16. The process of claim 13 further comprising sodium hydroxide to dissolve the gibbsite and reform the sodium aluminate solution if the gibbsite needs to be removed from the subterranean formation.

17. The process of claim 13, wherein the sodium aluminate solution has a supersaturation ratio ranging from about 100% to about 300% at a temperature ranging from about 70° C. to about 200° C.

18. The process of claim 13 having a pH ranging from about 8 to about 14.

19. The process of claim 13, wherein the sodium aluminate solution is prepared using a molar ratio of $Na_2O$:$Al_2O_3$ of about 0.5 to about 4.0.

20. The process of claim 13, wherein the sodium aluminate solution is maintained at a temperature ranging from about 70° C. to about 200° C. prior to being contacted with the subterranean formation.

21. The process of claim 13, wherein the subterranean formation has a temperature ranging from about 70° C. to about 200° C.

22. The process of claim 13, wherein the step of delaying crystallization occurs such that complete crystallization occurs at a crystallization time that ranges from about 10 minutes to about 100 days.

23. A process of treating a subterranean formation so that thief zones or fractures are plugged in the subterranean formation at a substantial distance from a wellbore, the process comprising the steps of:
   a. contacting the subterranean formation with both a sodium aluminate solution and a hot water slug, the sodium aluminate solution forming gibbsite ($Al(OH)_3$ s) within the subterranean formation, where the sodium aluminate solution comprises $NaAl(OH)_4$ and a delayed crystallization additive and where a ratio of the sodium aluminate solution to the hot water slug is in a range of from about 10 to about 0.01; and
   b. delaying crystallization of the gibbsite using the delayed crystallization additive so that the thief zones or fractures can be plugged with the precipitated gibbsite at a substantial distance from the wellbore.

* * * * *